United States Patent [19]
Davison

[11] 3,730,643
[45] May 1, 1973

[54] WIND POWER MACHINE

[76] Inventor: Fred E. Davison, Highwood, Mont. 59450

[22] Filed: Apr. 9, 1971

[21] Appl. No.: 132,651

[52] U.S. Cl. .................................................. 416/8, 415/5
[51] Int. Cl. ............................................... F01d 23/00
[58] Field of Search ........................ 416/7, 8, 17, 40, 416/41, 98, 110, 111, 116, 119; 415/5

[56] References Cited

UNITED STATES PATENTS

| | | | |
|---|---|---|---|
| 443,641 | 12/1890 | Eastman | 416/8 |
| 1,518,022 | 12/1924 | Twiford | 416/17 |
| 1,526,631 | 2/1925 | Fagan | 416/8 |
| 1,791,731 | 2/1931 | Madarasz | 416/41 X |

*Primary Examiner*—Everette A. Powell, Jr.
*Attorney*—Berman, Davidson & Berman

[57] ABSTRACT

A wind power machine in which a plurality of sails connected to an endless chain move about an endless horizontal track to drive an electric generator. Each sail is mounted on an individual truck supported on the track. The endless track is arranged as two spaced apart parallel runs connected by semi-circular end sections. Each sail is rotatable about a vertical pivot on its truck and is controllable so that the sails can be positioned to drive the machine while moving along one run of the track and to be positioned to offer the least wind resistance while moving in the reverse direction along the other run of the track. Depending upon the direction of the wind the sails in most instances can be adjusted to provide drive along both runs of the track. The sails are adjusted by an electric motor drive controlled by a wind vane.

In a modified control system an anemometer is provided to over ride the wind vane control, to align the sails with the wind to present the least resistance to the wind when the wind power machine is subjected to winds of damaging force.

8 Claims, 17 Drawing Figures

INVENTOR.
FRED E. DAVISON,

PATENTED MAY 1 1973

INVENTOR.
FRED E. DAVISON,
BY
Berman, Davidson & Berman,
ATTORNEYS.

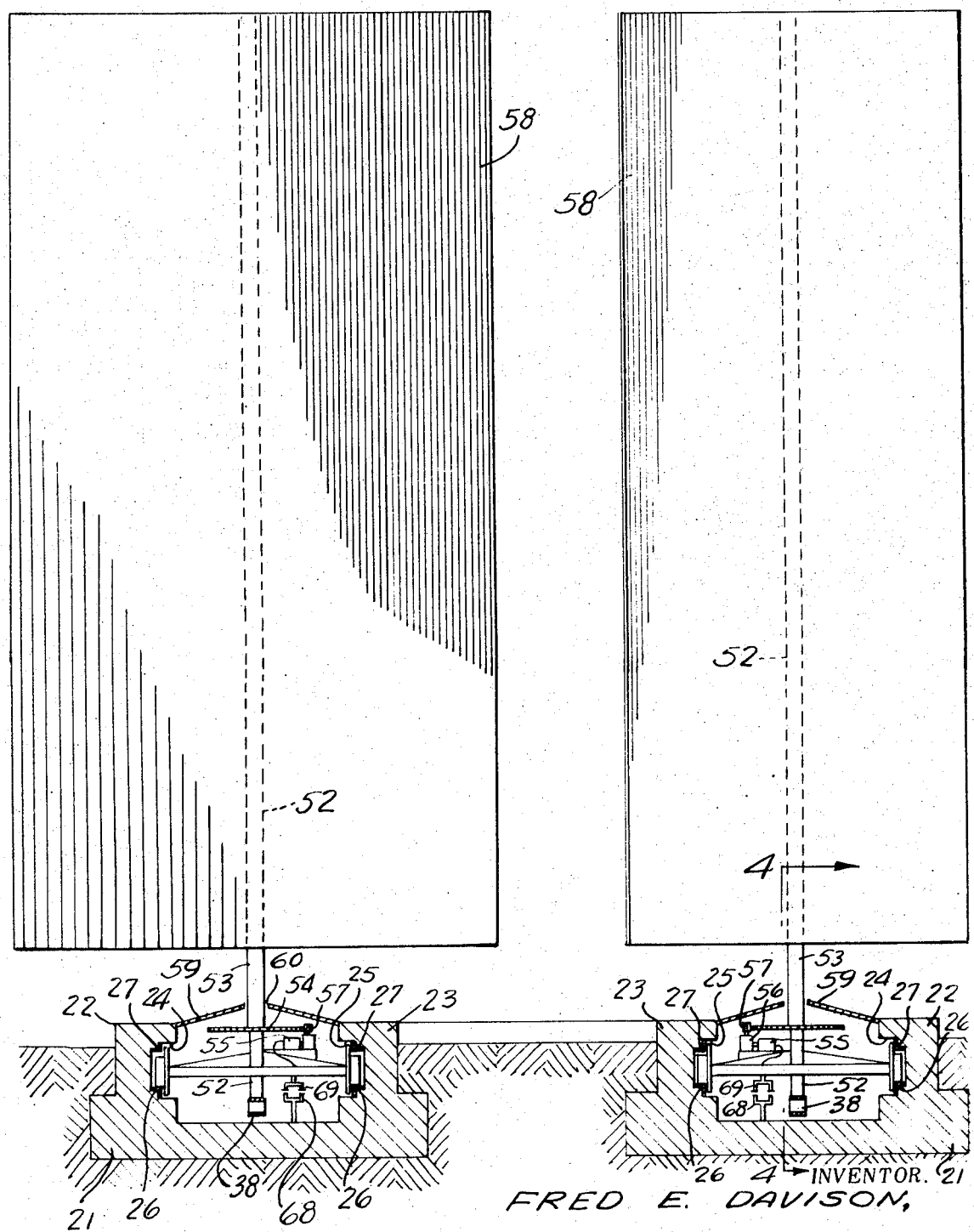

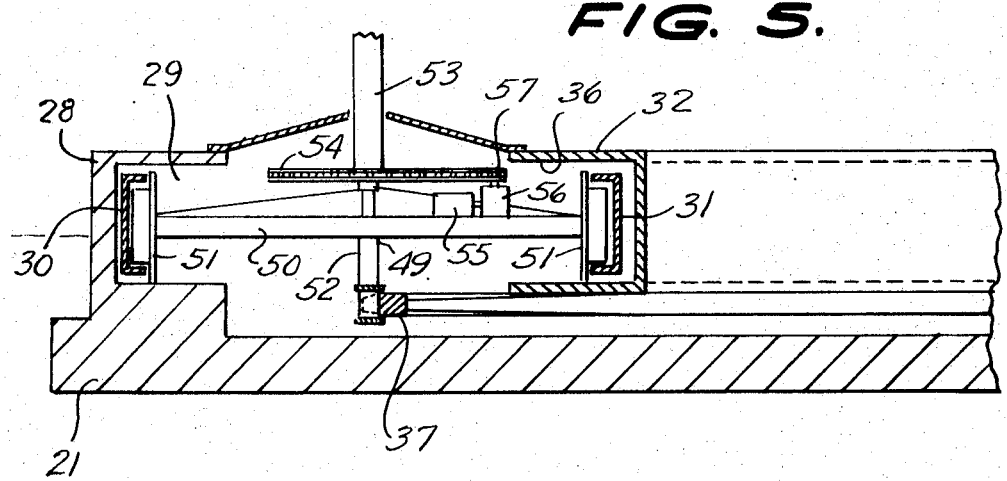
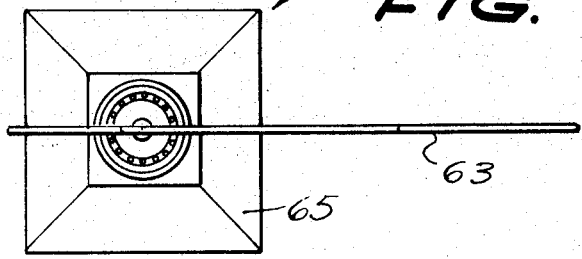
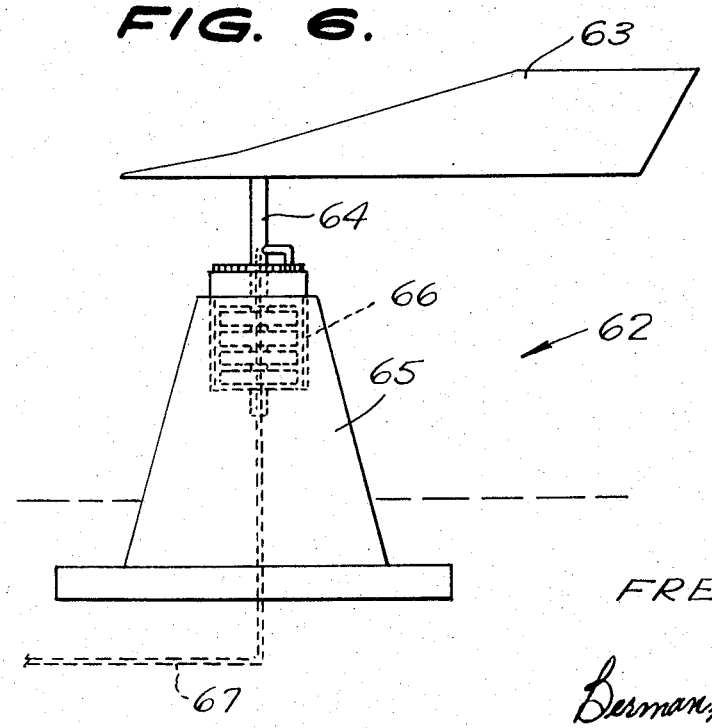

INVENTOR.
FRED E. DAVISON,
BY
Berman, Davidson & Berman,
ATTORNEYS.

WIND POWER MACHINE

BACKGROUND OF THE INVENTION

FIELD OF THE INVENTION

The present invention relates to wind machines of the traveling sail type.

SUMMARY OF THE INVENTION

The present invention includes a plurality of truck mounted sails which are adjustable about a vertical pivot to position the sail for the maximum driving effort. The trucks travel along an endless track which includes relatively long spaced parallel runs connected by short semi-circular runs with the trucks being connected by a chain which drives an electric generation unit. The sails are adjustable to provide the maximum driving effort when moving with or across the wind and the minimum resistance when moving against the wind. In one control system an anemometer is provided for adjusting the sails to a least resistance position when subjected to high velocity winds.

The primary object of the invention is to provide a wind power machine capable of producing a tremendous horse power without pollution.

Other objects and advantages will become apparent in the following specification when considered in the light of the attached drawings.

BRIEF DESCRIPTION OF THE DRAWINGS

FIG. 3 is a transverse vertical section taken along the line 3—3 of FIG. 1, looking in the direction of the arrows;

FIG. 5 is an enlarged fragmentary vertical sectional view taken along the line 5—5 of FIG. 1, looking in the direction of the arrows;

FIG. 6 is a side elevation of one of the wind vanes for controlling the sails;

FIG. 7 is a top plan view of the wind vane illustrated in FIG. 6;

DESCRIPTION OF THE PREFERRED EMBODIMENTS

Figure 1:
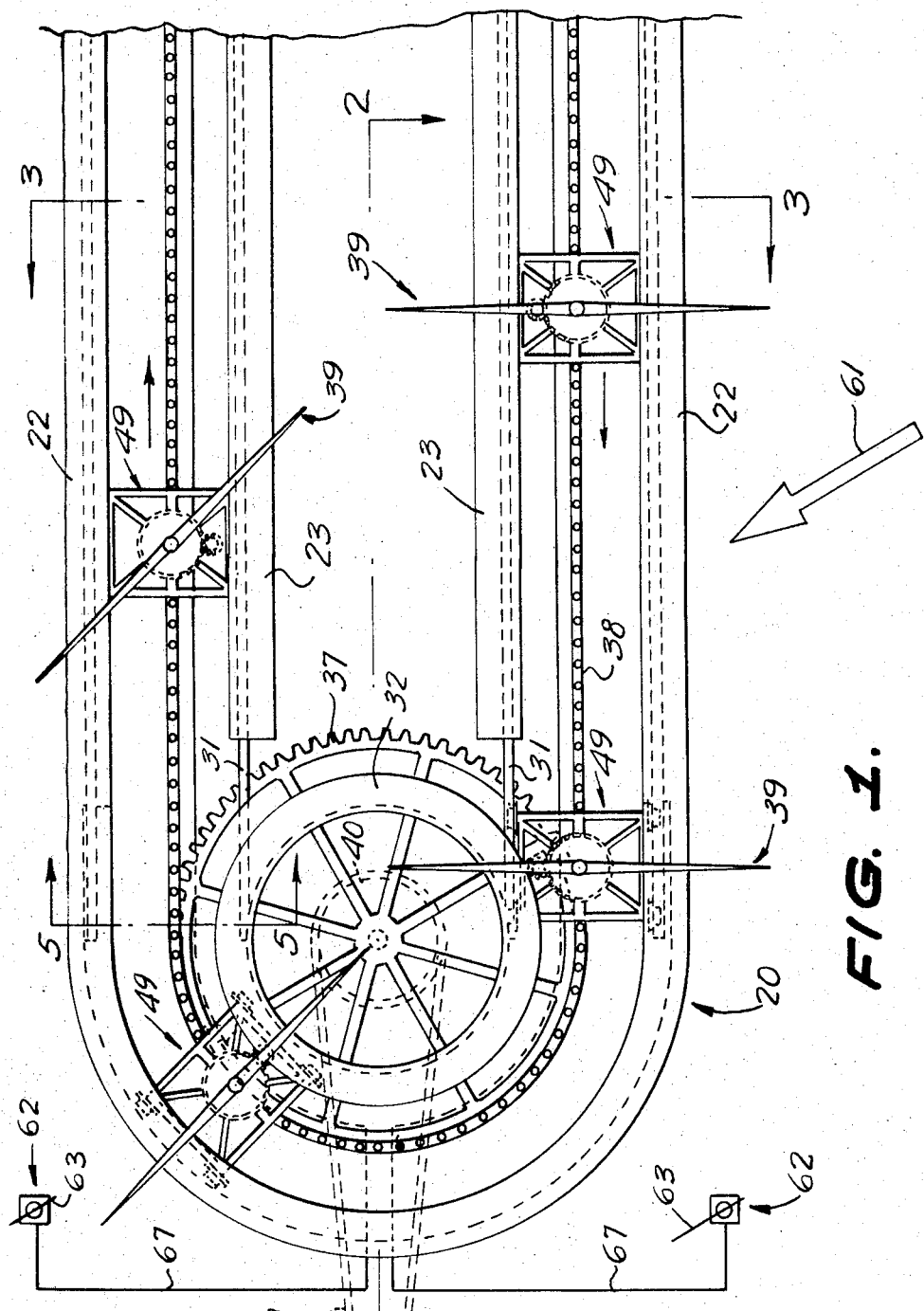
FIG. 1 is a fragmentary top plan view of the invention.
Figure 2:
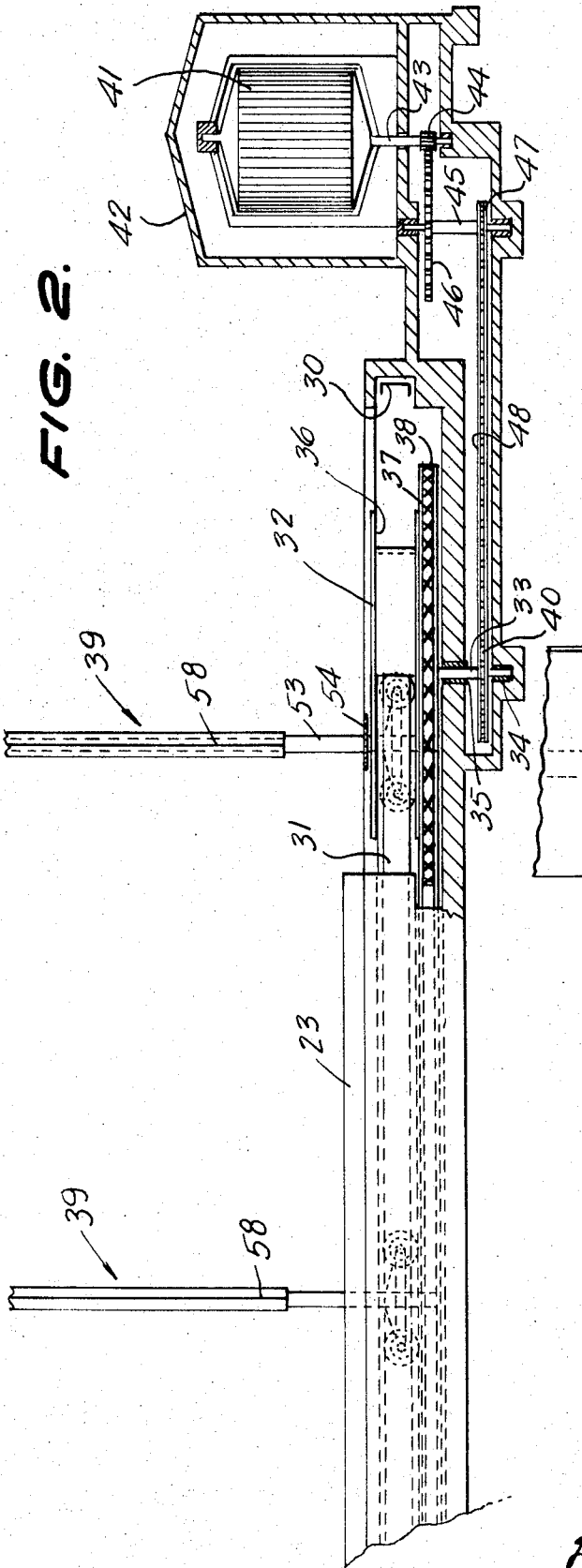
FIG. 2 is a fragmentary vertical sectional view taken along the line 2—2 of FIG. 1, looking in the direction of the arrows.
Figure 4:
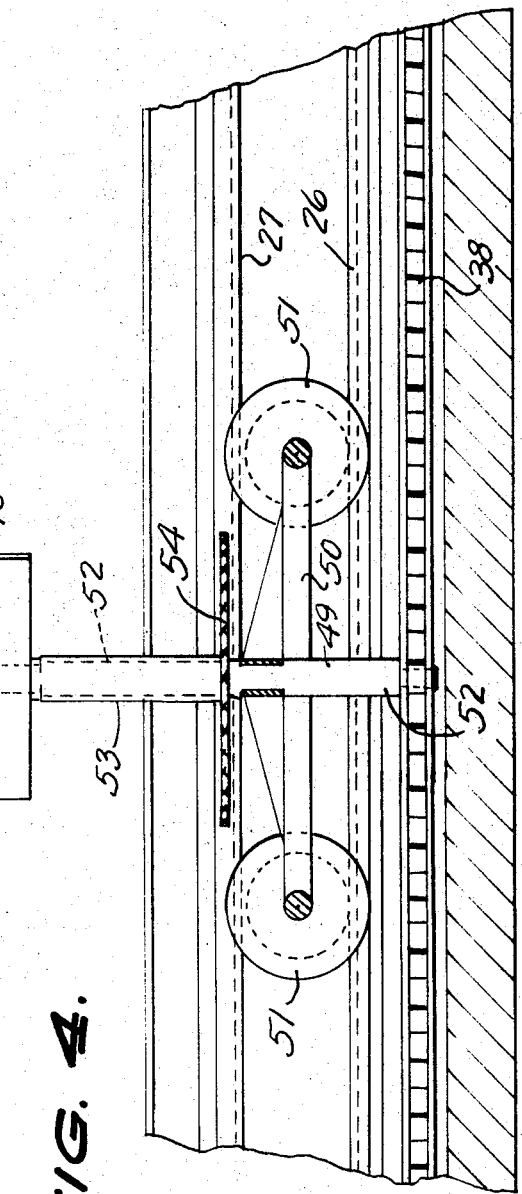
FIG. 4 is an enlarged fragmentary vertical sectional view taken along the line 4—4 of FIG. 3, looking in the direction of the arrows.

Referring now to the drawings in detail wherein like reference characters indicate like parts throughout the several figures the reference numeral 20 indicates generally a wind power machine constructed in accordance with the invention.

The wind power machine 20 includes a base 21 having a pair of upstanding walls 22, 23 arranged in spaced apart relation. The wall 22 has a recess 24 and the wall 23 has a recess 25 with the recesses 24, 25 being formed in the adjacent sides of the walls 22, 23 and extending longitudinally therealong. Lower angle iron track members 26 are mounted in the lower portion of each of the recesses 24, 25 and upper angle iron track members 27 are arranged in upwardly spaced parallel relation to the track members 26. The base member 21 and upstanding walls 22, 23 extend along both sides of the wind machine 20 with the upstanding walls 22 connected by a semi-circular upstanding end wall 28. The end wall 28 has a recess 29 formed therein and an upright channel iron track 30 is mounted in the recess 29 as a continuation of the track members 26, 27 in the recess 24.

An upright channel iron track member 31 extends from the end of the track members 26, 27 in the recess 25, for reasons to be assigned.

A relatively large wheel 32 is positioned at each end of the wind power machine 20 mounted on a vertical shaft 33 for rotation therewith. The vertical shaft 33 is journalled in a bearing 34 at its lower end and in a bearing 35 spaced thereabove. The wheel 32 has an annular channel shaped groove 36 on its outer edge. The channel member 31 on each side of the machine 20 extends into the annular groove 36 and terminates on the transverse center line of the wheel 32. A relatively large sprocket gear 37 is fixed to the underside of the wheel 32 at each end of the machine 20. An endless drive chain 38 is trained over the sprocket gears 37 and extends from one end of the machine to the other to connect the sails generally indicated at 39 in a manner described below.

A sprocket gear 40 is mounted on the lower end of the shaft 33 and is adapted to turn therewith.

An electric generator 41 is positioned in a house 42 adjacent one end of the machine 20 and has its shaft 43 extending perpendicularly therein. A spur gear 44 is mounted on the shaft 43 adjacent the lower end thereof. A shaft 45 is mounted in upright relation parallel to the shaft 43 underlying the house 42. A gear 46 is fixed to the shaft 45 and meshes with the gear 44 to drive the shaft 43 from the shaft 45. A sprocket gear 47 is fixed to the lower end of the shaft 45 and a sprocket drive chain 48 is trained over the sprocket gear 47 and the sprocket gear 40 to transmit the drive of the shaft 33 to the shaft 45. From this it can be seen that rotation of the wheel 32 when driven by the chain 38 through the sprocket gear 37 will cause the electric generator 41 to be operated.

A plurality of identical trucks 49, each have a frame 50 supported on four flanged railroad wheels 51 at the four corners thereof. The railroad wheels 51 ride on the track members 26 with their upper edges engaging against the track members 27. A perpendicular post 52 extends centrally above and below the frame 50 with the lower end of the post 52 secured to the sprocket chain 38.

A tubular sleeve 53 is journalled on the post 52 above the frame 50 and has a gear 54 rigidly secured to the lower end thereof. An electric motor 55 is mounted on the frame 50 and drives a gear box 56 thereon having a spur gear 57 associated therewith and meshing with the gear 54. Rotation of the electric motor 55 causes the gear 54 and the sleeve 53 to rotate about a vertical axis.

A generally rectangular upright sail 58 is mounted on the shaft 52 for rotation thereon and is fixedly secured to the upper end of the sleeve 53 for rotation therewith.

A cover 59 is secured to the walls 22, 23 and extends upwardly and inwardly therefrom to a slot 60 which is continuous to permit the shaft 52 and sleeve 53 to extend upwardly from the truck 49 to the sail generally indicated at 39.

In FIG. 1 the arrow 61 indicates the direction of the wind which is moving transversely of the machine 20 at an angle to the perpendicular.

A wind vane indicated generally at 62 is provided for each run of the wind machine 20 and includes a vane 63 mounted on a shaft 64 journalled in the base 65 of the wind vane 62 to permit the vane 63 to align itself with the direction of the flow of the wind. A servo-motor sender 66 is mounted in the base 65 and is actuated by rotation of the shaft 64 to send a signal through a cable 67 extending to the wind power machine 20. The electric motor 55 is a servo-motor which responds to the servo-motor sender 66 when connected thereto. A conventional track electric pick-up 68 is mounted on the base 21 for engagement by a shoe 69 on each of the trucks 49 to connect the servo-motor 55 to the servo-motor sender 66. The track 68 on one side of the machine 20 would be connected to one of the wind vanes 62 and the track 68 on the other side thereof would be connected to the opposite wind vane 62.

With the machine 20 in operation, movement of the sails 39 on their trucks 49 is in a clockwise direction, as viewed from overhead, and the sails 39 on the run of the machine 20 closest to the wind are set, as can be seen in FIG. 1, perpendicular to the direction of travel and at an angle to the wind, so as to move the sails 39 to the left in the lower run of the machine 20, as viewed in FIG. 1. The sails 39 in the upper run of the machine 20 are set to utilize the wind deflected from the sails in the opposite run, so that they too tend to move in the clockwise direction and assist in forcing the chain 38 to rotate the sprocket gear 37.

Figure 8:
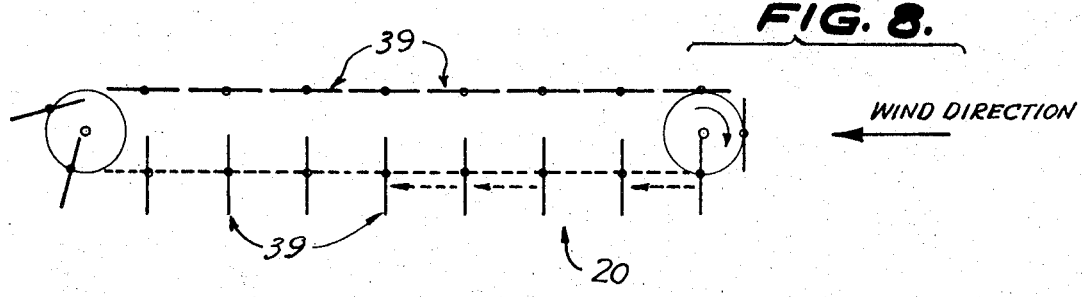
FIGS. 8 through 15 are diagrammatic views of the invention illustrating the setting of the sails to gain the maximum benefit from the wind when moving from a number of different directions, the arrow in each case indicating the wind force on the sails.
Figure 9:
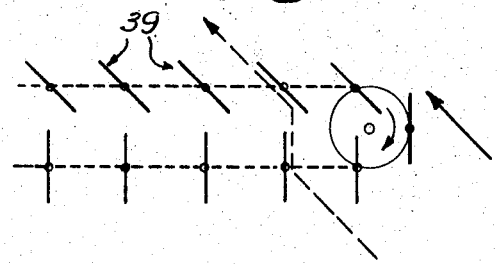
Figure 10:
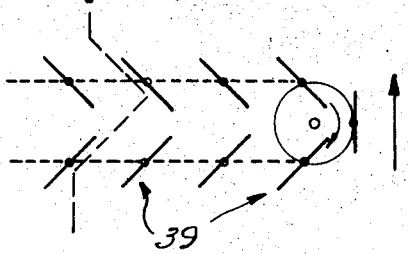
Figure 11:
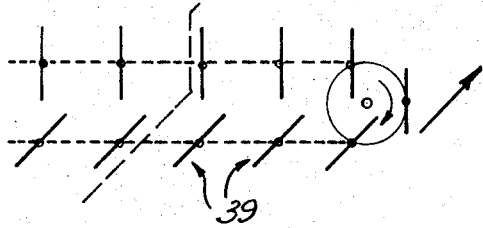
Figure 12:
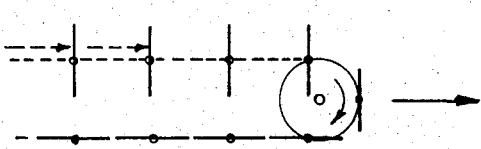
Figure 13:
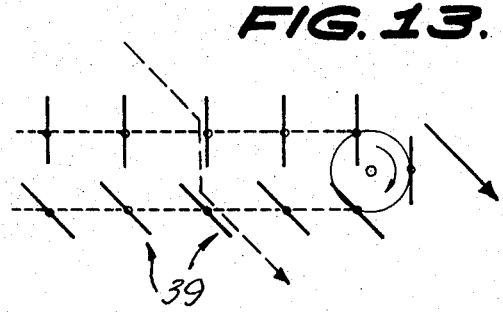
Figure 14:
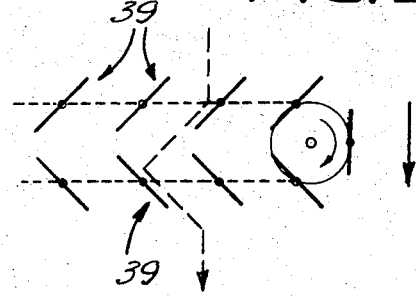
Figure 15:
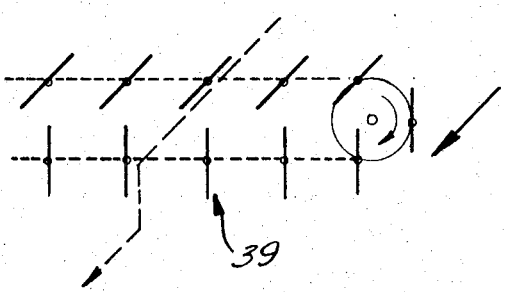

In FIGS. 8 and 12 the wind direction is parallel to the runs of the machine 20 and from the opposite directions. The sails 39 on the lower side of the machine 20, as viewed in FIG. 8, are set perpendicular to the wind while the sails 39 on the opposite run are set parallel to the direction of the wind flow to present no resistance upon their return movement. The setting in FIG. 12 since the wind is opposite is exactly opposite to that of FIG. 8. FIGS. 10 and 11 illustrate the setting of the sails when the wind is perpendicular to the run of the machine 20. As can be seen the sails 39 are set oppositely for opposite runs and both runs of the machine 20 have the sails 39 set to provide a driving force. In FIGS. 9, 11, 13 and 15 the wind direction is at a 45° angle from four different directions. The sails in this case are set so that driving force is obtained on both sides of the machine 20. With the direction of the sails being opposite when the wind is opposite.

Figure 16:
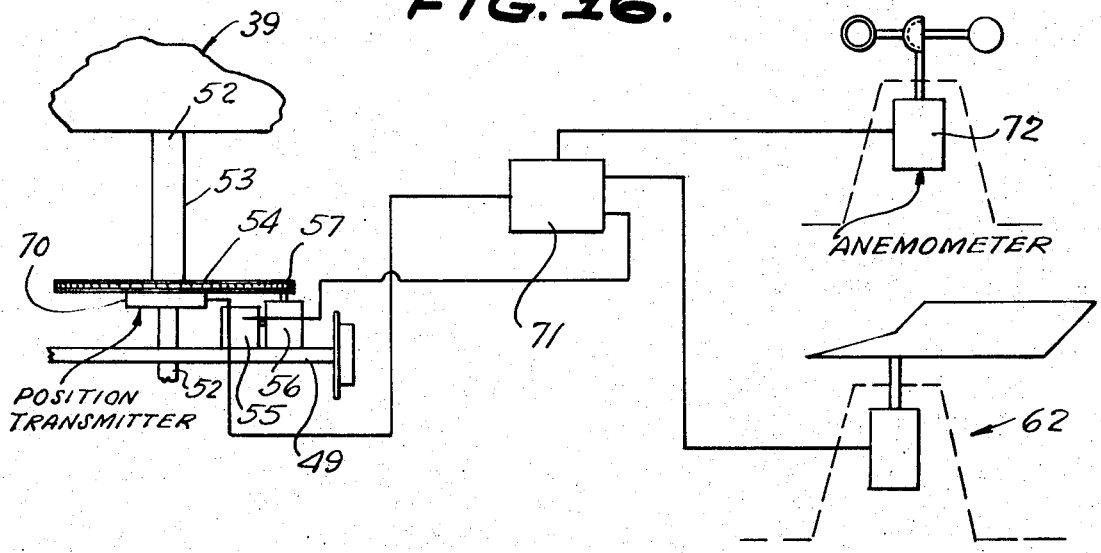
FIG. 16 is a semi-diagrammatic showing of the control system when including an anemometer.

In FIG. 16 the truck 49 is illustrated supporting the shaft 52, sleeve 53, gear 54 and electric motor 55. The gear box 56 is shown connected to the spur gear 57 which is in driving engagement with the gear 54. A position transmitter 70 is mounted on the shaft 52 and is driven by the gear 54. A servo-amplifier and computer 71 is connected to the motor 55, position transmitter 70, a conventional anemometer 72 and the wind vane 62. With the arrangement as shown in FIG. 16 when the force of the wind actuating the anemometer 72 reaches a velocity which could be damaging to the sail 39 the servo-amplifier and computer determines the position of the sail 39 with respect to the direction of the wind as indicated by the wind vane 62 and actuates the motor 55 to turn the sail 39 so that it is parallel to the flow of the wind and offers the least resistance thereto.

Figure 17:
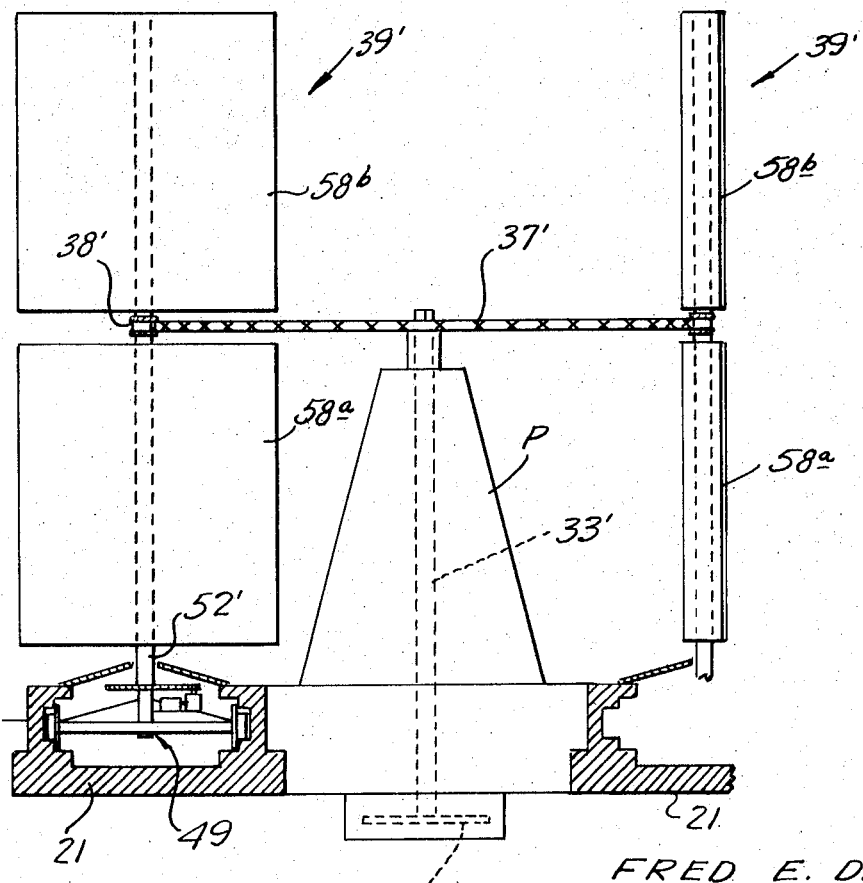
FIG. 17 is a transverse sectional view of a modified form of the invention with the sails formed in two parts.

In FIG. 17 a modified form of the invention is illustrated wherein an identical base 21 is provided for supporting and guiding the trucks 49 along an endless path. Sails generally indicated at 39' are mounted on a shaft 52' which extends upwardly from the truck 49. A pair of generally rectangular sail members 58a and 58b are mounted on the shaft 52' with their planes parallel but vertically spaced apart intermediate their upper and lower ends. A chain 38' connects each of the sails 39' at the center of the shaft 52' between the sails 58a and 58b. A relatively large sprocket wheel 37', at each end of the machine, is fixed to a shaft 33' having a drive sprocket 40' mounted on its lower end, the chain 38' is trained over the sprockets 40'. The shaft 33' is supported in a post T extending upwardly from the base 21.

The use and operation of the modified form of the invention illustrated in FIG. 17 is identical to that of the preferred form of the invention described above.

Having thus described the preferred embodiments of the invention it should be understood that numerous structural modifications and adaptations may be resorted to without departing from the spirit of the invention.

What is claimed is:

1. A wind power machine comprising a generally horizontal elongate base mounted in fixed position on the ground, an endless path formed in said base including a pair of spaced parallel rails and including a pair of relatively long spaced apart parallel runs connected at their opposite ends by relatively short semi-circular runs, a plurality of trucks mounted for movement along said endless path on said rails at spaced apart intervals, a flexible endless chain extending along said path and connecting said trucks, rotatable drive means journalled on said base adjacent each of said semi-circular runs portions, said drive means engaged by said endless chain for rotating said drive means upon movement of said trucks along said path, a vertical shaft supported solely at its lower end on each of said trucks, a sail mounted on each of said vertical shafts for rotation about a vertical axis, means on said truck for rotating said sails to a desired position relative to the wind direction, and means adjacent one end of each of said parallel runs controlled by the direction of the wind for controlling the means for rotating said sails.

2. A device as claimed in claim 1, wherein the means on said trucks for rotating said sails includes an electric servo-motor which rotationally adjusts the position of each of said sails on each of said trucks, said last named means includes a pair of wind vane servo-actuators separately connected to the trucks in each of said runs to separately control the sails thereon.

3. A device as claimed in claim 1, wherein each of said trucks includes a generally horizontal frame supported on a plurality of flanged railroad wheels adapted for engagement with the rails in said endless path, said shaft extending perpendicularly of each of said trucks being rigidly secured thereto with the lower end of said shaft connected to the means connecting said trucks.

4. A device as claimed in claim 3 wherein means journalled on said shaft supports said sail and includes a sleeve rigidly connected to said sail, a gear rigidly connected to the lower end of said sleeve, and the means on said truck for rotating said sails includes an electric servo-motor associated with said gear to rotate said gear upon energization of said motor.

5. A device as claimed in claim 1 wherein the means for rotating said sails on said trucks includes a servo-motor on each of said trucks, and said last named means includes a pair of wind vanes each including a servo-actuator with said wind vanes separately controlling the sails traveling along the relatively long straight runs of said endless path, and means controlled by the velocity of the wind for moving said sails into a position of least resistance to the wind to prevent wind damage thereto.

6. A device as claimed in claim 1 wherein the sails moving along one of the relatively long runs are separately rotatably adjustable from the sails moving along the other of said relatively long runs.

7. A device as claimed in claim 1 wherein an electric generator unit is connected to said drive means for operation thereby.

8. A device as claimed in claim 5 wherein the means controlled by the velocity of the wind comprises an anemometer.

* * * * *